United States Patent
Brosnihan et al.

(10) Patent No.: US 10,274,351 B2
(45) Date of Patent: Apr. 30, 2019

(54) METHOD OF MAKING A MULTIVARIABLE VORTEX FLOWMETER

(71) Applicant: Invensys Systems, Inc., Foxboro, MA (US)

(72) Inventors: Paul F. Brosnihan, Millbury, MA (US); Javier Lopera, Quincy, MA (US); Stephen B. Talutis, Milton, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 423 days.

(21) Appl. No.: 15/079,822

(22) Filed: Mar. 24, 2016

(65) Prior Publication Data

US 2016/0202095 A1    Jul. 14, 2016

Related U.S. Application Data

(63) Continuation of application No. 14/275,665, filed on May 12, 2014, now Pat. No. 9,322,683.

(51) Int. Cl.
*G01F 1/32* (2006.01)
*G01F 1/34* (2006.01)
(Continued)

(52) U.S. Cl.
CPC .......... *G01F 1/3218* (2013.01); *G01F 1/3209* (2013.01); *G01F 1/3254* (2013.01);
(Continued)

(58) Field of Classification Search
CPC ......... Y10T 29/49826; Y10T 29/49908; Y10T 29/49945; Y10T 29/49966;
(Continued)

(56) References Cited

U.S. PATENT DOCUMENTS 3,729,995 A    5/1973    Kovacs et al.
4,072,051 A    2/1978    Peterson
(Continued)

OTHER PUBLICATIONS

Endress + Hauser Instruments International AG, Proline Prowirl 72F, 72W, 73F, 73W Publication, 64 pages, Published Jan. 2011.

*Primary Examiner* — Sarang Afzali
*Assistant Examiner* — Darrell C Ford
(74) *Attorney, Agent, or Firm* — Stinson Leonard Street LLP

(57) ABSTRACT

A method of making a sensor assembly for a vortex flowmeter includes securing a vortex sensor to a vortex sensor housing. The vortex sensor housing is secured to a sensor body that is configured to seal a process penetration opening to limit flow of process fluid out of the flowmeter through the process penetration opening. A pair of pressure-responsive diaphragms is secured to the vortex sensor housing such that the pressure-responsive diaphragms face outwardly from opposite sides of the housing and such that the vortex sensor is positioned to detect motion of at least one of the pressure-responsive diaphragms. A mounting hole is made in the sensor body spaced apart from the vortex sensor housing. A temperature sensor housing is secured to the sensor body through the mounting hole. A temperature sensor is inserted in the temperature sensor housing for sensing a temperature of the process fluid.

6 Claims, 11 Drawing Sheets

(51) Int. Cl.
  *G01F 1/68* (2006.01)
  *G01F 1/86* (2006.01)
  *G01F 15/02* (2006.01)
  *G01F 25/00* (2006.01)

(52) U.S. Cl.
  CPC .............. *G01F 1/34* (2013.01); *G01F 1/68* (2013.01); *G01F 1/86* (2013.01); *G01F 15/024* (2013.01); *G01F 25/0007* (2013.01); *Y10T 29/49826* (2015.01); *Y10T 29/49908* (2015.01); *Y10T 29/49945* (2015.01); *Y10T 29/49966* (2015.01); *Y10T 29/49968* (2015.01)

(58) Field of Classification Search
  CPC ......... Y10T 29/49968; Y10T 29/49947; G01F 1/3218; G01F 15/024; G01F 25/0007; G01F 1/3254; G01F 1/86; G01F 1/34; G01F 1/68; G01F 1/3209
  USPC ... 29/428, 505, 525, 525.13, 525.14, 525.01
  See application file for complete search history.

(56) References Cited

U.S. PATENT DOCUMENTS

| | | | |
|---|---|---|---|
| 4,249,164 A | 2/1981 | Tivy | |
| 4,419,898 A | 12/1983 | Zanker et al. | |
| 4,437,349 A | 3/1984 | Joy | |
| 4,455,877 A | 6/1984 | Blechlinger et al. | |
| 4,807,481 A * | 2/1989 | Lew | G01F 1/3254 |
| | | | 73/861.24 |
| 5,218,857 A | 6/1993 | Decker et al. | |
| 5,323,657 A | 6/1994 | Vander Heyden | |
| 5,326,969 A | 7/1994 | Fagan et al. | |
| 5,361,632 A | 11/1994 | Magnani | |
| 5,422,014 A | 6/1995 | Allen et al. | |
| 5,429,001 A | 7/1995 | Kleven | |
| 5,435,180 A | 7/1995 | Uchiyama et al. | |
| 5,447,073 A | 9/1995 | Kalinoski | |
| 5,463,904 A | 11/1995 | Kalinoski | |
| 5,558,069 A | 9/1996 | Stay | |
| 5,604,685 A | 2/1997 | Seesink et al. | |
| 5,780,736 A | 7/1998 | Russell | |
| 5,829,248 A | 11/1998 | Clifton | |
| 5,899,066 A | 5/1999 | Brassea-Flores | |
| 5,922,970 A | 7/1999 | Ohle | |
| 5,939,643 A | 8/1999 | Oertel et al. | |
| 5,942,696 A | 8/1999 | Kleven | |
| 5,996,355 A | 12/1999 | Jirnov et al. | |
| 6,003,384 A | 12/1999 | Frohlich et al. | |
| 6,058,787 A | 5/2000 | Hughes | |
| 6,082,116 A | 7/2000 | Tunkel et al. | |
| 6,101,885 A | 8/2000 | Touzin et al. | |
| 6,170,338 B1 | 1/2001 | Kleven et al. | |
| 6,182,453 B1 | 2/2001 | Forsberg | |
| 6,257,071 B1 | 7/2001 | Dessert et al. | |
| 6,305,232 B1 | 10/2001 | Ohle et al. | |
| 6,343,514 B1 | 2/2002 | Smith | |
| 6,345,536 B1 | 2/2002 | Morrison et al. | |
| 6,351,999 B1 | 3/2002 | Maul et al. | |
| 6,352,000 B1 | 3/2002 | Getman et al. | |
| 6,412,353 B1 | 7/2002 | Kleven et al. | |
| 6,422,092 B1 | 7/2002 | Morrison et al. | |
| 6,453,721 B1 | 9/2002 | Grzeslo et al. | |
| 6,472,884 B1 | 10/2002 | Brockhaus | |
| 6,484,590 B1 | 11/2002 | Kleven et al. | |
| 6,523,347 B1 | 2/2003 | Jirnov et al. | |
| 6,543,297 B1 * | 4/2003 | Kleven | F16L 23/006 |
| | | | 374/E13.006 |
| 6,619,909 B2 | 9/2003 | Barnett et al. | |
| 6,651,512 B1 | 11/2003 | Kleven et al. | |
| 6,651,514 B2 | 11/2003 | Zanker | |
| 6,756,571 B2 | 6/2004 | Saikalis et al. | |
| 6,840,317 B2 | 1/2005 | Hirsch et al. | |
| 6,868,741 B2 | 3/2005 | Harman | |
| 6,887,601 B2 | 5/2005 | Moulthrop, Jr. et al. | |
| 6,910,387 B2 | 6/2005 | Koudal et al. | |
| 6,912,918 B1 | 7/2005 | Lynnworth et al. | |
| 6,932,876 B1 | 8/2005 | Statnikov | |
| 6,938,496 B2 | 9/2005 | Koudal et al. | |
| 6,957,585 B2 | 10/2005 | Sprague | |
| 6,988,418 B2 | 1/2006 | Koudal et al. | |
| 7,007,556 B2 | 3/2006 | Keita et al. | |
| 7,044,001 B2 | 5/2006 | Sylvia et al. | |
| 7,073,394 B2 | 7/2006 | Foster | |
| 7,162,931 B2 | 1/2007 | Moser et al. | |
| 7,258,024 B2 | 8/2007 | Dinarco et al. | |
| RE39,863 E | 10/2007 | Smith | |
| 7,290,450 B2 | 11/2007 | Brown et al. | |
| 7,307,729 B2 | 12/2007 | Moshe | |
| 7,363,811 B2 | 4/2008 | Dannhauer et al. | |
| 7,366,621 B2 | 4/2008 | Sprague | |
| 7,398,697 B2 | 7/2008 | Allen et al. | |
| 7,406,878 B2 | 8/2008 | Rieder et al. | |
| 7,464,777 B2 | 12/2008 | Gonzalez | |
| 7,523,662 B2 | 4/2009 | Drahm et al. | |
| 7,579,947 B2 | 8/2009 | Peluso | |
| 7,600,436 B2 | 10/2009 | Hoecker | |
| 7,603,914 B2 | 10/2009 | Hoecker | |
| 7,660,689 B2 | 2/2010 | Mattar | |
| 7,836,780 B2 | 11/2010 | Garnett et al. | |
| 7,854,282 B2 | 12/2010 | Lee et al. | |
| 7,878,073 B2 | 2/2011 | Hoecker | |
| 7,882,751 B2 | 2/2011 | Hoecker | |
| 7,926,361 B2 | 4/2011 | Hoecker | |
| 7,946,168 B2 | 5/2011 | Hoecker | |
| 7,999,120 B2 | 8/2011 | Heilek et al. | |
| 8,010,312 B2 | 8/2011 | Hocker | |
| 8,024,136 B2 | 9/2011 | Jezernik et al. | |
| 8,056,424 B2 | 11/2011 | Maahs | |
| 8,079,271 B2 | 12/2011 | Hoecker | |
| 8,087,293 B2 | 1/2012 | Dou et al. | |
| 8,116,913 B2 | 2/2012 | Mirpourian et al. | |
| 8,200,450 B2 | 6/2012 | Hocker | |
| 8,353,223 B2 | 1/2013 | Bunker | |
| 8,370,098 B2 | 2/2013 | Rocker | |
| 8,375,807 B2 | 2/2013 | Kossek et al. | |
| 8,380,463 B2 | 2/2013 | Philipps | |
| 8,429,983 B2 | 4/2013 | Furlong et al. | |
| 8,447,536 B2 | 5/2013 | Hocker | |
| 8,495,990 B1 | 7/2013 | Rivera et al. | |
| 8,522,625 B2 | 9/2013 | Philipps | |
| 10,066,976 B2 * | 9/2018 | Huang | G01F 1/3218 |
| 2007/0284112 A1 * | 12/2007 | Magne | E21B 43/01 |
| | | | 166/336 |
| 2009/0241687 A1 * | 10/2009 | Matsubara | G01F 1/3209 |
| | | | 73/861.24 |
| 2010/0307262 A1 * | 12/2010 | Lewicke | G01F 1/3209 |
| | | | 73/861.22 |
| 2011/0125424 A1 * | 5/2011 | Han | G01F 1/32 |
| | | | 702/47 |
| 2011/0211614 A1 * | 9/2011 | Gmelin | G01K 1/14 |
| | | | 374/208 |
| 2012/0160032 A1 * | 6/2012 | Habersetzer | G01F 15/02 |
| | | | 73/861.01 |
| 2013/0282309 A1 * | 10/2013 | Hollmach | G01F 25/0007 |
| | | | 702/45 |
| 2013/0283895 A1 * | 10/2013 | Etherington | G01F 1/6842 |
| | | | 73/114.34 |
| 2018/0266857 A1 * | 9/2018 | Lais | G01F 1/3209 |

* cited by examiner

METHOD OF MAKING A MULTIVARIABLE VORTEX FLOWMETER

CROSS REFERENCE TO RELATED APPLICATION

This application is a continuation of U.S. application Ser. No. 14/275,665, filed May 12, 2014, now U.S. Pat. No. 9,322,683, the entire contents of which are hereby incorporated by reference.

FIELD OF THE INVENTION

Aspects of the present invention generally relate to vortex flowmeters. More particularly, aspects of the present invention relate to vortex flowmeters that include a temperature sensor.

BACKGROUND OF THE INVENTION

Flowmeters measure the rate of flow of a fluid in a pipe or other pathway. The fluid may be, for example, a gas or a liquid, and may be compressible or incompressible. One type of flowmeter is a vortex flowmeter, which use the principle of vortex shedding to measure flow rate. Vortex shedding refers to a process in which a fluid passing a bluff body (sometimes referred to as a shedder) causes a boundary layer of slowly moving fluid to be formed along the surface of the bluff body. A low pressure area is created behind the bluff body and causes the boundary layer to roll up and form a vortex. This process is repeated and results in a series of vortices in succession on opposite sides of the bluff body. The vortices can be detected using one or more of several different measurement principles. In one example, a pressure sensor detects the pressure effects of the vortices. The frequency at which the vortices are generated is related to flow rate. Vortex flowmeters are considered linear flowmeters, as the measured vortex frequency varies generally linearly with volumetric flow rate. Accordingly, by measuring the frequency of the pressure variations associated with the vortices, the flow rate may be determined.

Vortex flowmeters provide vortex frequency data that can be used in conjunction with flow calibration factors to determine the velocity and volumetric flow rate of the fluid passing through the meter. "Intelligent" vortex flowmeters locally perform the calculations necessary to convert the frequency data into an indication of flow rate. Some intelligent vortex flowmeters, called multivariable meters, are capable of receiving additional measurement data (e.g., temperature or line pressure signals) and using that data to improve the traditional flow rate measurement. For example, calibration factors are assumed constant in many conventional flowmeters. However, in multivariable meters that are configured to receive a temperature signal, these calibration factors can be compensated for changes in temperature. Likewise, temperature and/or pressure signals may be used to determine a fluid density measurement that can be combined with the volumetric flow rate to produce a mass flow measurement. These measurements, and others, can be transmitted to a control room or other receiver over a communication line, such as, for example, a standard two-wire 4-20 milliamp ("mA") transmission line, wireless transmission, and others.

Accordingly, an improved multivariable vortex flowmeter configuration is desired.

SUMMARY OF THE INVENTION

In one aspect, the present invention includes a sensor assembly for a vortex flowmeter of the type having a flowtube having a flowtube wall defining a passage for flow of a process fluid through the flowtube, a bluff body in the flowtube for generating vortices, and a sensor for detecting vortices formed by the bluff body. The sensor assembly is configured to extend into contact with the process fluid through a process penetration opening. The sensor assembly includes a sensor body configured to seal the process penetration opening to limit flow of process fluid from the passage out of the flowmeter through the process penetration opening. A vortex sensor housing is secured to the sensor body. The vortex sensor housing has a pair of pressure-responsive diaphragms facing outwardly from opposite sides of the vortex sensor housing. A vortex sensor is positioned to detect motion of at least one of the pressure-responsive diaphragms to detect vortices formed in the process fluid. A temperature sensor housing is secured to the sensor body and spaced from the vortex sensor housing. A temperature sensor in the temperature sensor housing senses a temperature of the process fluid.

In another aspect, the present invention includes a vortex flowmeter including a flowtube having a flowtube wall defining a passage for flow of a process fluid through the flowtube, a bluff body positioned to generate vortices in the process fluid as the process fluid flows through the passage, and a sensor assembly extending into contact with the process fluid through a process penetration opening. The sensor assembly has a sensor body positioned to seal the process penetration opening to limit flow of process fluid from the passage out of the flowmeter through the process penetration opening. A vortex sensor housing is secured to the sensor body. The vortex sensor housing has a pair of pressure-responsive diaphragms facing outwardly from opposite sides of the vortex sensor housing. A vortex sensor is positioned to detect motion of at least one of the pressure-responsive diaphragms to detect vortices formed in the process fluid. A temperature sensor housing is secured to the sensor body and spaced from the vortex sensor housing. A temperature sensor in the temperature sensor housing senses a temperature of the process fluid.

In yet another aspect, the present invention includes a vortex flowmeter including a flowtube having a flowtube wall defining a passage for flow of a process fluid through the flowtube, a bluff body positioned to generate vortices in the process fluid as the process fluid flows through the passage, a cavity positioned above the bluff body and in fluid communication with the passage in the flowtube on each side of the bluff body, and a sensor assembly extending into the cavity through a process penetration opening. The sensor assembly includes a sensor body positioned to seal the process penetration opening to limit flow of process fluid from the passage and cavity out of the flowmeter through the process penetration opening. A vortex sensor housing is secured to the sensor body. The vortex sensor housing has a pair of pressure-responsive diaphragms facing outwardly from opposite sides of the vortex sensor housing. A vortex sensor is positioned to detect motion of at least one of the pressure-responsive diaphragms to detect vortices formed in the process fluid. A temperature sensor housing is secured to the sensor body and spaced from the vortex sensor housing. A temperature sensor in the temperature sensor housing senses a temperature of the process fluid in the cavity.

In still another aspect, the present invention includes a method of making a sensor assembly for a vortex flowmeter of the type having a flowtube having a flowtube wall defining a passage for flow of a process fluid through the flowtube, a bluff body in the flowtube for generating vortices, and a sensor for detecting vortices formed by the bluff body. The sensor assembly is configured to extend into contact with the process fluid through a process penetration opening. The method includes providing a sensor body configured to seal the process penetration opening to limit flow of process fluid from the passage out of the flowmeter through the process penetration opening. A vortex sensor housing secured to the sensor body is provided. A vortex sensor is secured to the vortex sensor housing. A pair of pressure-responsive diaphragms is secured to the vortex sensor housing such that the pressure-responsive diaphragms face outwardly from opposite sides of the vortex sensor housing and such that the vortex sensor is positioned to detect motion of at least one of the pressure-responsive diaphragms to detect vortices formed in the process fluid. A mounting hole is provided in the sensor body spaced apart from the vortex sensor housing. A temperature sensor housing is secured to the sensor body through the mounting hole. A temperature sensor is secured in the temperature sensor housing for sensing a temperature of the process fluid.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
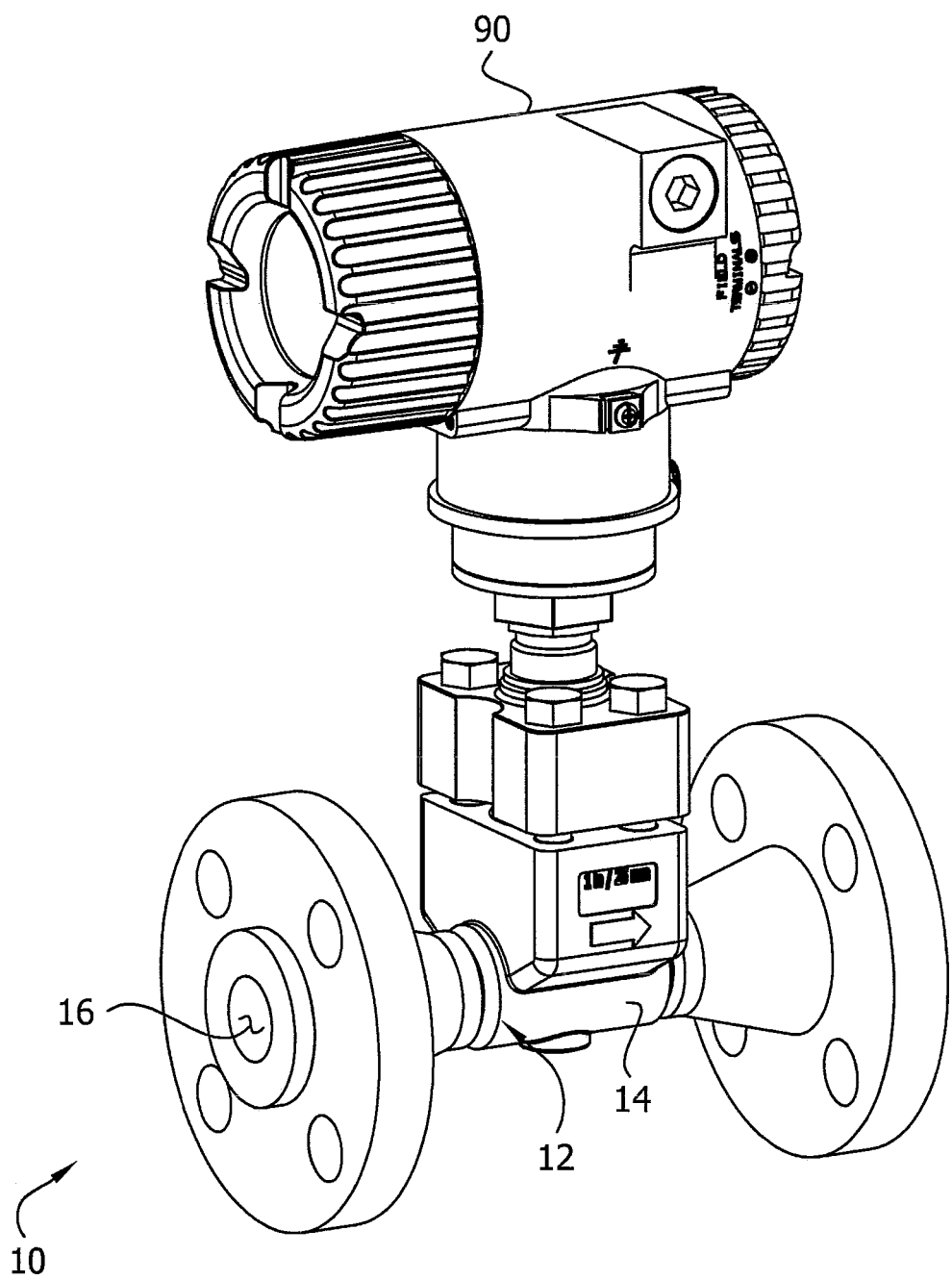
FIG. 1 is a perspective of one embodiment of a vortex flowmeter.
Figure 2:
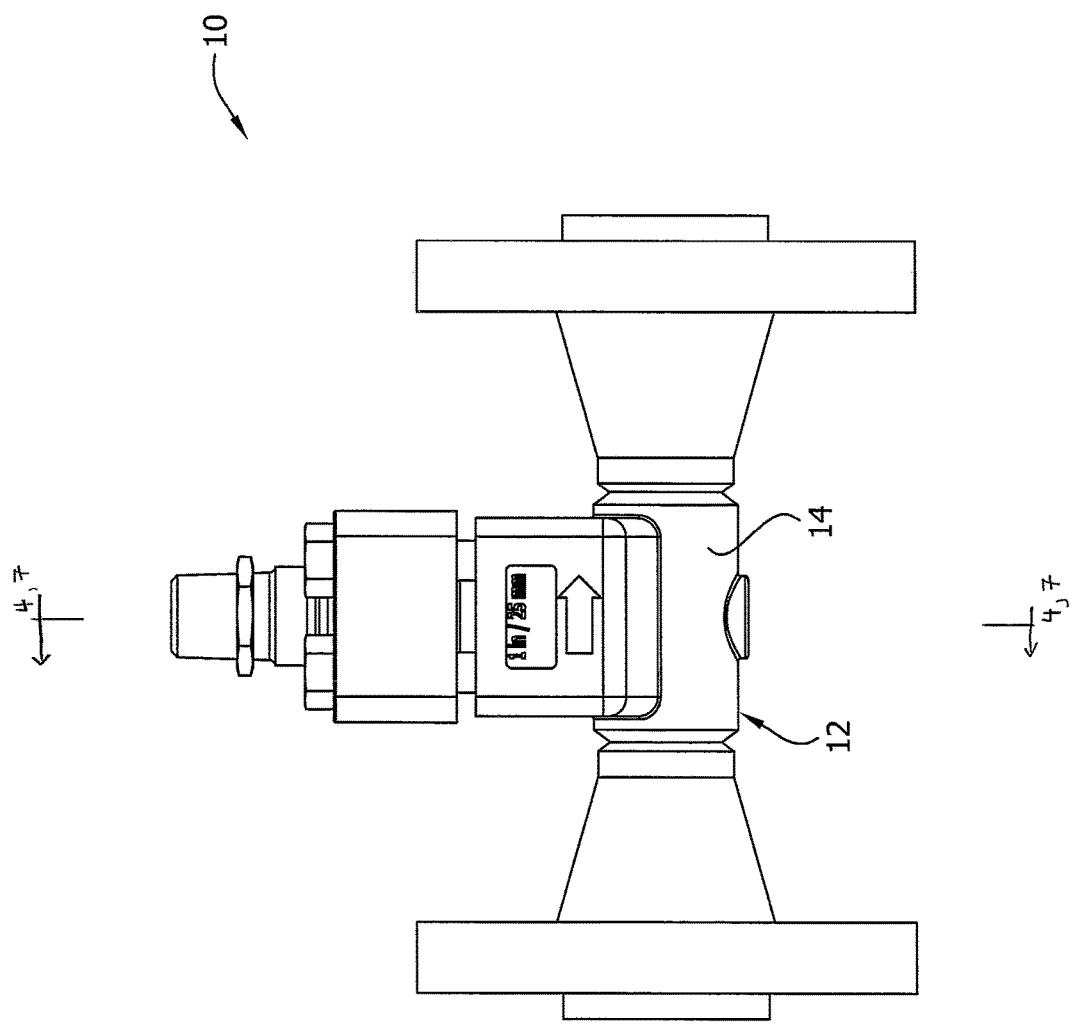
FIG. 2 is a side elevation of the vortex flowmeter.
Figure 3:
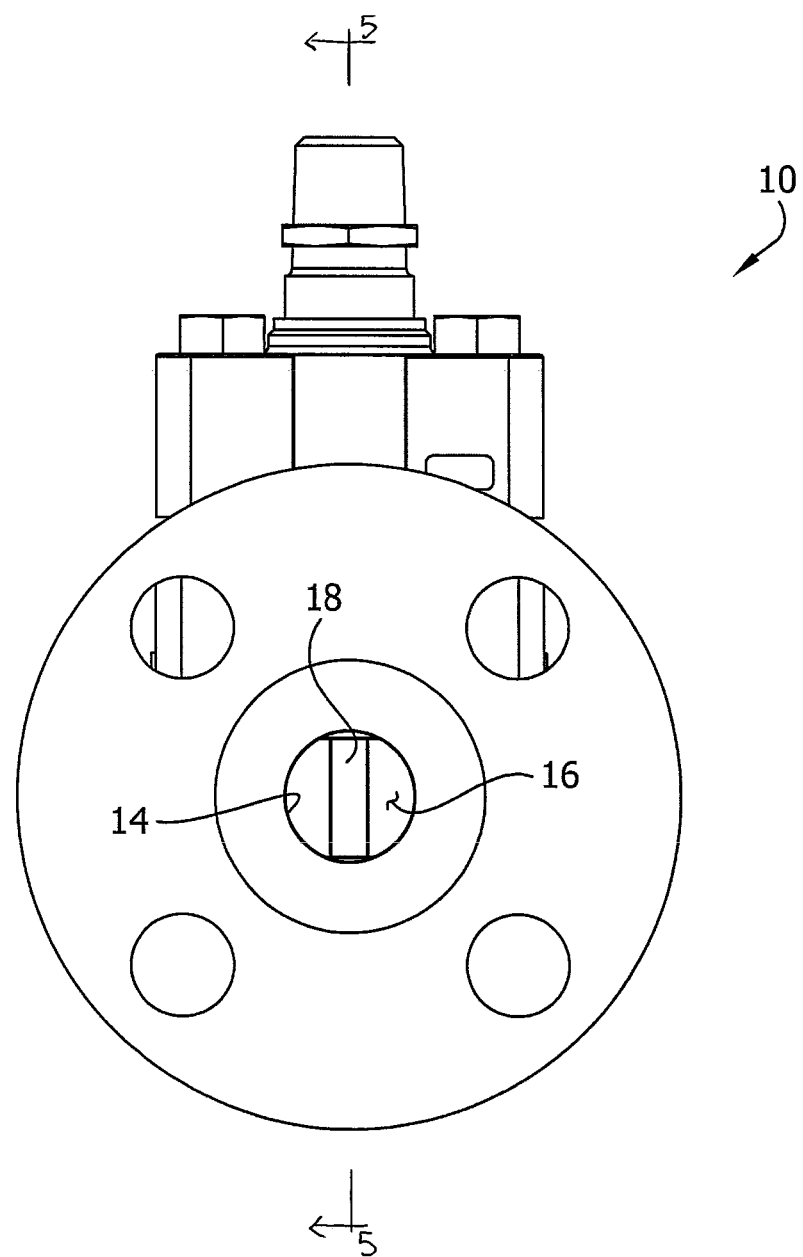
FIG. 3 is a front elevation of the vortex flowmeter.

Referring to FIGS. 1-5, one embodiment of a multivariable vortex flowmeter of the present invention is generally indicated at reference number 10. The flowmeter 10 has a flowtube 12 having a flowtube wall 14. The flowtube wall 14 defines a passage 16 for flow of a process fluid through the flowtube 12. A bluff body 18 (FIG. 3) is positioned in the flowtube 12 for generating vortices in the process fluid as the process fluid flows through the passage 16. A sensor assembly 20 (FIGS. 4, and 5-7) for detecting vortices formed by the bluff body 18 extends into contact with the process fluid through a process penetration opening 22.

Figure 6:
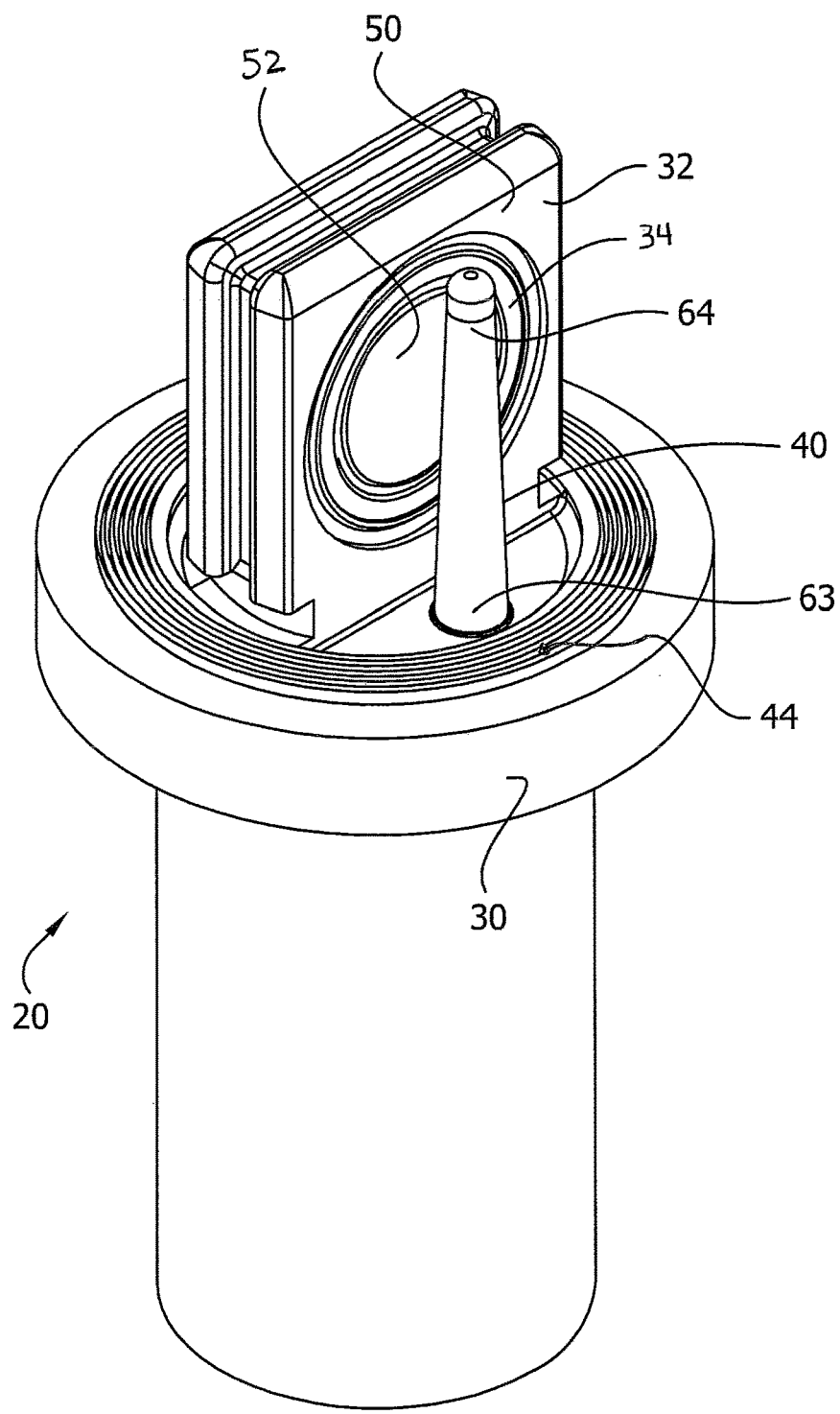
FIG. 6 is a perspective of one embodiment of a sensor assembly for use in the vortex flowmeter of FIGS. 1-5.
Figure 7:
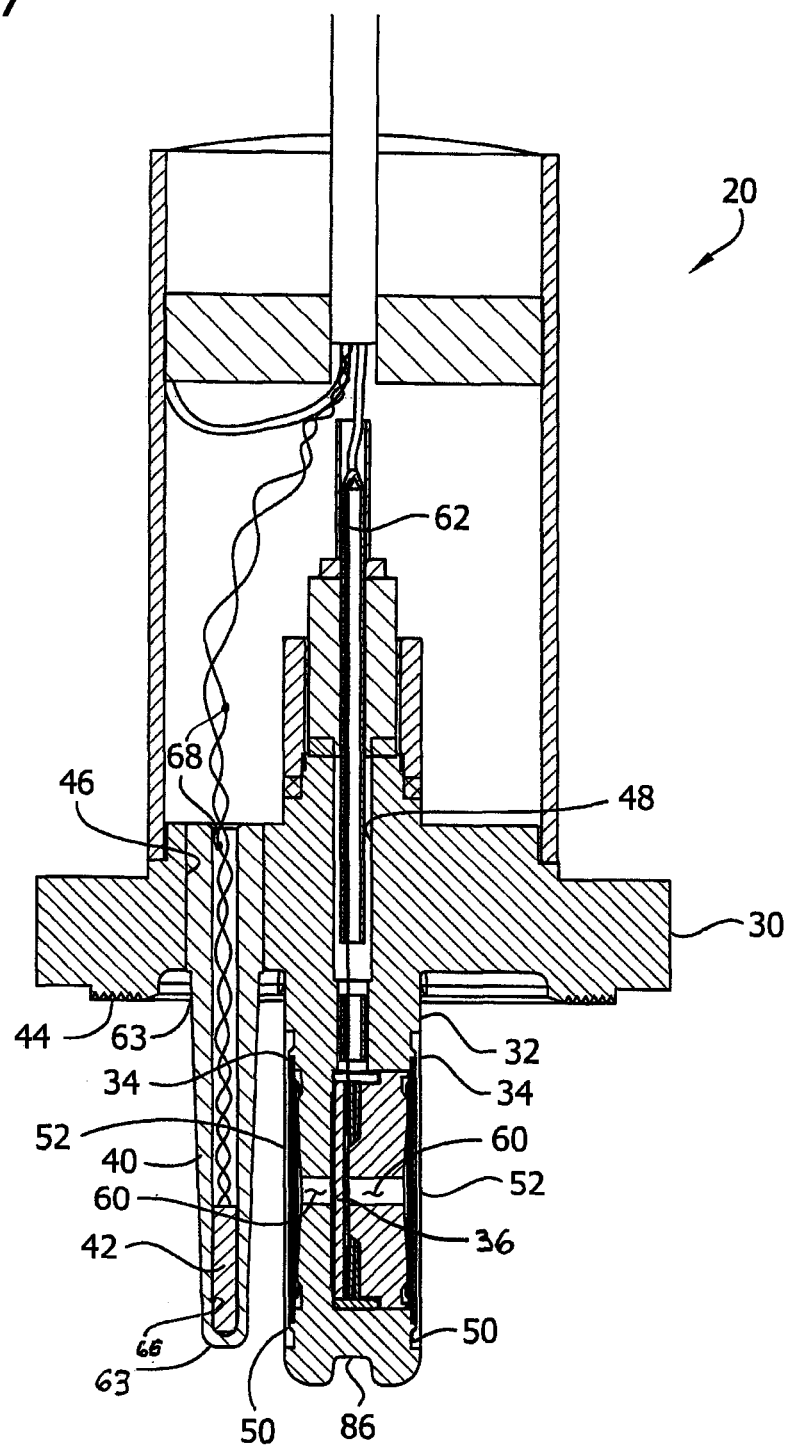
FIG. 7 is a cross section of the sensor assembly of FIG. 6 taken along line 7-7 of FIG. 2.

The sensor assembly 20 includes a sensor body 30 configured to seal the process penetration opening 22. By sealing the process penetration opening 22, the sensor body 30 limits flow of the process fluid from the passage 16 out of the flowmeter 10 through the process penetration opening. As shown in FIGS. 6-7, the sensor assembly 20 comprises a vortex sensor housing 32 secured to the sensor body 30. In the illustrated embodiment, the vortex sensor housing 32 and the sensor body 30 are formed as one piece (e.g., a cast unitary body). However, the vortex sensor housing and the sensor body can be formed separately instead. The vortex sensor housing 32 has a pair of pressure-responsive diaphragms 34 facing outwardly from opposite sides of the vortex sensor housing. A vortex sensor 36 (FIG. 4A) is positioned in the vortex sensor housing 32 to detect motion of at least one of the pressure-responsive diaphragms 36 and thereby detect vortices formed in the process fluid. A temperature sensor housing 40 is secured to the sensor body 30 and spaced from the vortex sensor housing 32. The temperature sensor housing 40 houses a temperature sensor 42 disposed therein. The temperature sensor 42 senses a temperature of the process fluid flowing through the passage 16 of the flowmeter 10. In the illustrated embodiment, the temperature sensor 42 includes an RTD temperature sensor. However, other temperature sensors (e.g., thermocouples, thermistors, etc.) can be used without departing from the scope of the invention.

Figure 4:
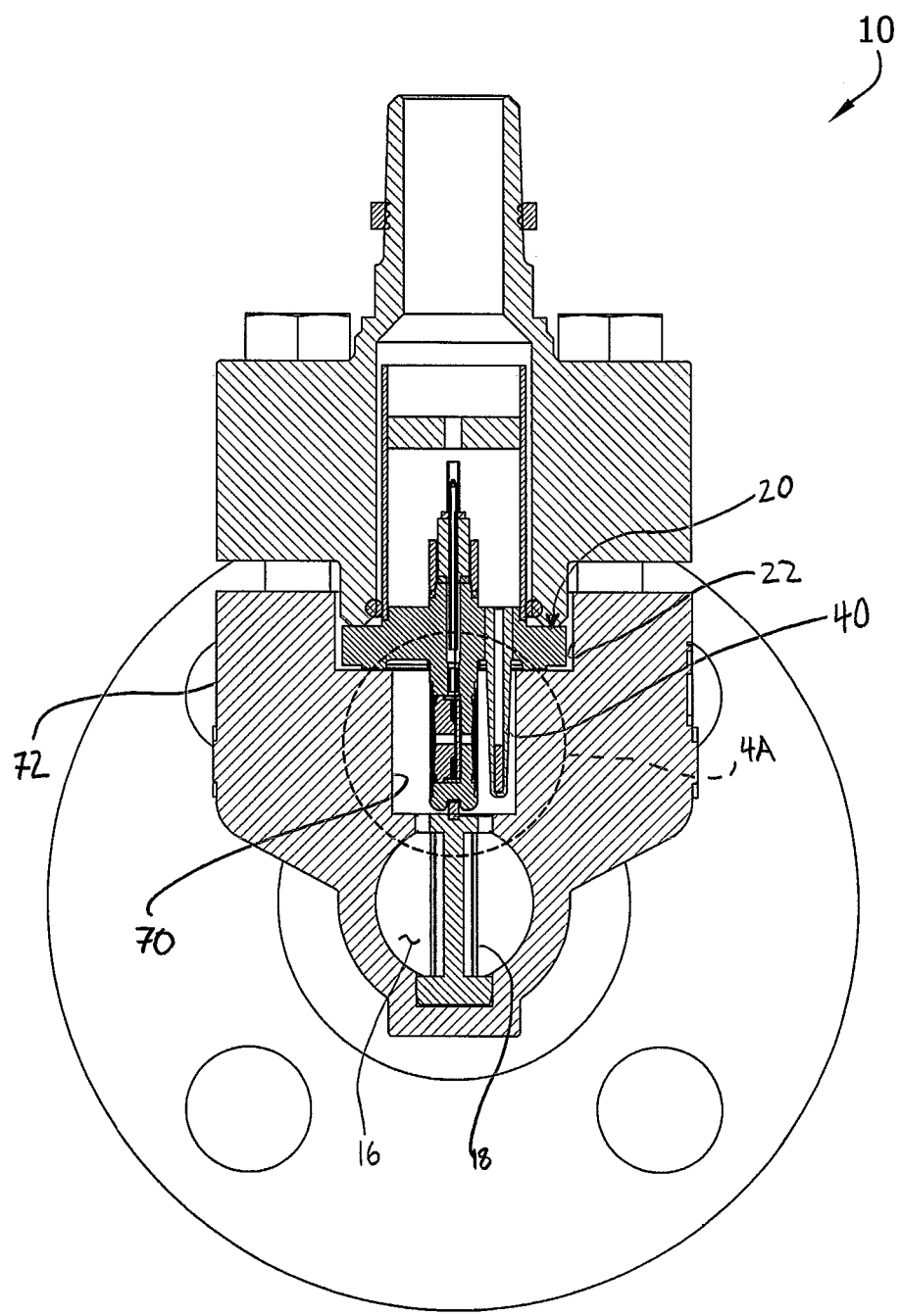
FIG. 4 is a cross section of the vortex flowmeter taken along line 4-4 of FIG. 2.
Figure 5:
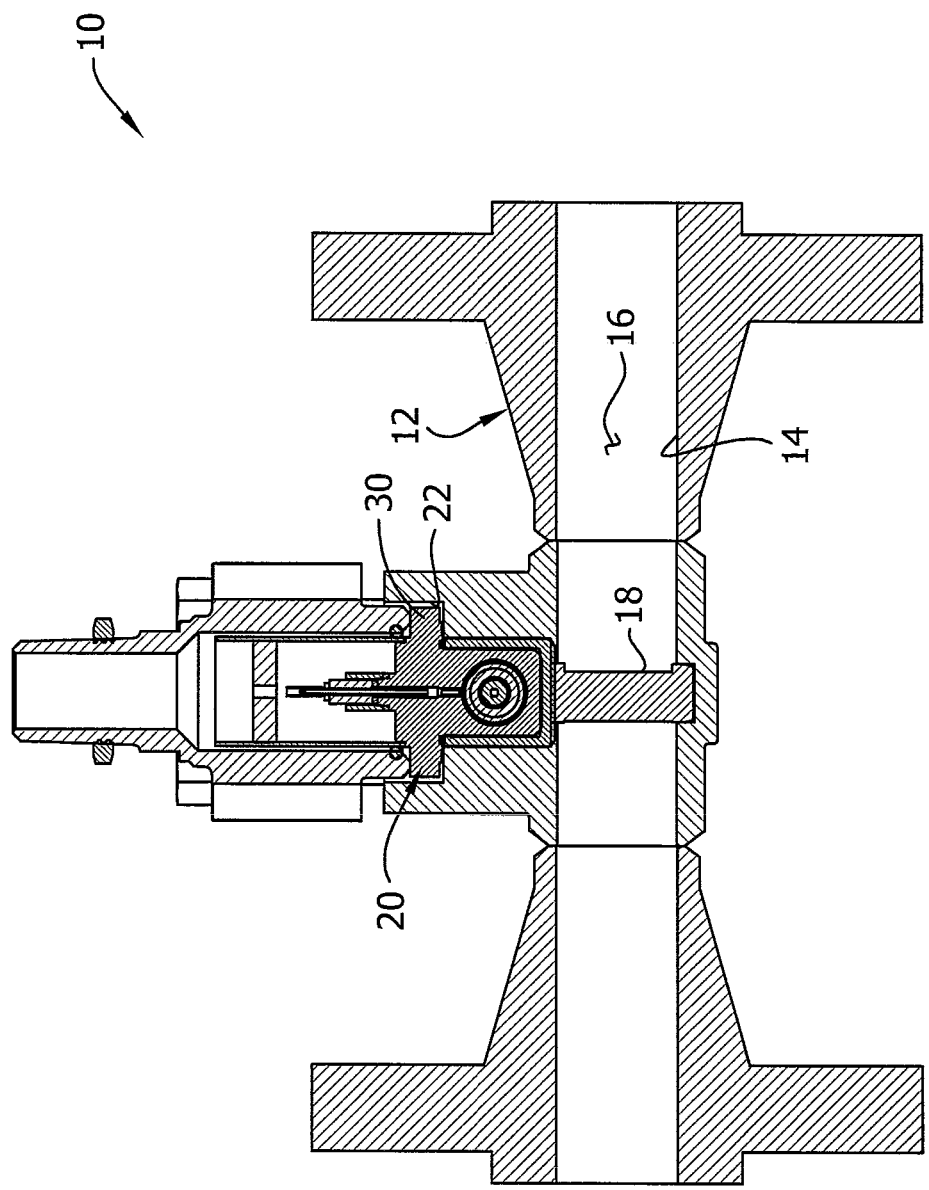
FIG. 5 is a cross section the vortex flowmeter taken along line 5-5 of FIG. 3.

The illustrated sensor body 30 comprises a mounting flange attached to the vortex sensor housing 32. The sensor body 30 extends radially outward from the sensor housing 32 about an electrical conduit 48. One or more electrical conductors 62 (FIG. 7) extends through the electrical conduit 48 to convey vortex signals from the vortex sensor 36 to a transmitter 90. The sensor body 30 has a mounting surface 44 configured to engage an opposed mounting surface of the flowtube 12 adjacent the process penetration opening 22 (FIGS. 4-5). Engagement between the mounting surface 44 and the mounting surface of the flowtube 12 fluidly seals the process penetration opening 22 in the illustrated embodiment. As will be discussed in greater detail below, the sensor body 30 includes a mounting hole 46 configured to receive a portion of the temperature sensor housing 40 therein.

With continued reference to FIGS. 6-7, the vortex sensor housing 32 is secured to a (radially) central portion of the sensor body 30. In certain other embodiments, the sensor body is secured to the sensor housing at a location offset to one side of the sensor body with respect to the radial center of the body. In the illustrated embodiment, the pressure-responsive diaphragms 34 are positioned on generally planar opposite lateral sides 50 of the vortex sensor housing. The pressure-responsive diaphragms 34 are suitably separate components attached to the lateral sides 50 of the vortex sensor housing 32 as illustrated. Pressure-responsive diaphragms can also be integrated into the vortex sensor housing (as one piece therewith) without departing from the scope of the invention. One of the pressure-responsive diaphragms 34 is positioned so it faces the temperature sensor housing 40. Each of the pressure-responsive diaphragms 34 includes a major surface 52 configured to contact the process fluid when the sensor assembly 20 is installed in the flowmeter 10 (FIG. 4). Suitably, when the sensor assembly 20 is installed in the flowmeter 10, the major surfaces 52 of the pressure-responsive diaphragms 34 are oriented generally parallel to the flow of fluid through the passage 16. The pressure-responsive diaphragms 34 are configured to move with respect to the vortex sensor housing 34 as vortices are generated in the passage 16 in response to pressure variations in the fluid caused by the vortices.

Referring to FIG. 7, the illustrated vortex sensor 36 is configured to output a signal indicative of a differential pressure acting on the pair of pressure-responsive diaphragms 34. As illustrated, each of the pressure-responsive diaphragms 34 is positioned to contact the process fluid for direct measurement of the differential pressure. In a preferred embodiment, the vortex sensor 36 comprises a piezoelectric sensor, though other sensor types may also be used to detect a differential pressure acting on the pair of pressure-responsive diaphragms 34 without departing from the scope of the invention. The vortex sensor 36 is operatively connected to the each of the pressure-responsive diaphragms 34 to sense movements thereof with respect to the vortex sensor housing 32. Opposite sides of the vortex sensor 32 are in fluid communication with respective pressure-responsive diaphragms 36. More specifically, fluid paths 60 fluidly connect the vortex sensor 36 to each of the pressure-responsive diaphragms 34. In the illustrated embodiment, the fluid paths 60 are filled with a fill fluid (e.g., silicon) that is sealed from atmosphere and from the process fluid. One skilled in the art will appreciate, that the use of fill fluid is particularly suitable for low temperature applications such as, for example, process fluid temperatures less than about 400° F. In alternative embodiments, the fluid paths between the diaphragms 34 and the vortex sensor 36 are filled with air and vented to atmosphere. One skilled in the art will appreciate, that the use of vented fluid paths is particularly suitable for high temperature applications such as, for example, process fluid temperatures greater than about 300° (e.g., about 800°). Because the temperature sensor 42 is positioned spaced apart from the vortex sensor 36, the use of fill fluid does not adversely affect temperature measurement by insulating the temperature sensor from the process fluid.

The temperature sensor housing 40 includes an elongate tube that extends away from the sensor body 30. When the sensor assembly is installed in the process penetration opening 22 (FIG. 4), an outer surface of the temperature sensor housing 40 is positioned to directly contact the process fluid. The temperature sensor housing defines a sensor chamber 66 in which the temperature sensor 42 is positioned. Potting material can be disposed in the sensor chamber 66 with the temperature sensor 42. In the illustrated embodiment, the temperature sensor housing 40 tapers from a wider base 63 to a narrower end 64 opposite the base. An annular wall of the temperature sensor housing 40 has a wall thickness that is greatest at the base 63 of the temperature sensor housing, where it is secured to the sensor body 30. At the opposite end 64, the wall thickness of the temperature sensor housing 40 is narrower than at the base 63. This design offers several advantages. For example, the tapered shape of the temperature sensor housing 40 enables a press fit connection with the mounting hole 46. Moreover, the relatively thicker wall thickness at the base end 63 improves the strength of the temperature sensor housing 40 at the mounting point. The larger cross sectional area at the wider base also has a larger bending moment for increased robustness. The relatively thinner wall thickness at the opposite end 64 minimizes the temperature sensor housing's 40 insulating effects on the temperature sensor 42, thereby improving the thermal response of the temperature sensor to temperature changes in the process fluid. The sensor chamber 66 is open at the base 63 end of the temperature sensor housing 40 to permit an electrical conductor 68 (FIG. 7) to extend through the sensor body 30 and to carry a temperature signal from the temperature sensor 42 to the transmitter 90.

The temperature sensor housing 40 is connected to and extends away from the sensor body 30. In use, the temperature sensor housing 40 is configured to extend into the process fluid when the sensor assembly 20 is installed in the process penetration opening 22. In the illustrated embodiment, the temperature sensor housing 40 and the sensor body 30 are formed separately from one another. The temperature sensor housing 40 and sensor body 30 are suitably connected to one another using a press fit connection to secure the temperature sensor housing 40 to the sensor body 30. The temperature sensor housing 40 is also welded to the sensor body 30 to ensure the separate components remain secured to one another without relative movement. Other methods of securing a temperature sensor housing to a sensor body may also be used without departing from the scope of the invention. For example, a temperature sensor housing and a sensor body can be formed as one piece (e.g., as a unitary body of cast metal).

As shown in FIG. 4, when the sensor assembly 20 is installed in the process penetration opening 22, the temperature sensor housing 40 and the vortex sensor housing 32 are positioned so they each contact the process fluid. In the illustrated embodiment, the temperature sensor housing 40 has an elongate shape with a long axis that is generally parallel with the lateral sides 50 of the vortex sensor housing 32. The temperature sensor housing 40 extends away from the sensor body 30 along the long axis, which is generally parallel to the surface 52 of an adjacent one of the diaphragms 34. In the illustrated embodiment, the temperature sensor housing 40 is spaced laterally from the pressure-responsive surface 52 of the adjacent diaphragm 34. The temperature sensor housing 40 is suitably spaced apart from the vortex sensor housing 32 a distance in the range of about 0.5 mm to about 1.5 mm. Likewise, the temperature sensor housing 40 is suitably spaced apart from the pressure-responsive diaphragm 34 a distance in the range of about 0.5 mm to about 1.5 mm. It is understood that the temperature sensor housing can be arranged differently with respect to the sensor body without departing from the scope of the invention. For example, the length that the temperature sensor housing extends into the process fluid can vary. Even though in the embodiment of FIGS. 1-7 the pressure-responsive diaphragms 34 are not symmetrically positioned with respect to the temperature sensor housing 40 (i.e., the temperature sensor housing is positioned adjacent one of the diaphragms but not the other), the inventors have found the presence of a temperature sensor housing adjacent only one of the diaphragms does not adversely affect vortex detection.

Referring again to FIGS. 4 and 5, the illustrated vortex flowmeter 10 has a cavity 70 positioned above the bluff body 18 and in fluid communication with the passage 16 in the flowtube 12 on each side of the bluff body. A mounting pedestal 72 extends upwardly from the flowtube wall 14. In the illustrated embodiment, the cavity 70 is disposed in the mounting pedestal 72, and the sensor assembly 20 is mounted on the mounting pedestal. The process penetration is at the upper end of the pedestal 72. The illustrated mounting pedestal 72 is suitable for relatively small pipe diameter applications of the vortex sensor assembly 20. It will be appreciated that, without departing from the scope of the invention, in other embodiments the vortex sensor assembly sits in a cavity that is not disposed in a mounting pedestal or extends into a slot in the bluff body so the pressure responsive diaphragms are at least partially in the passage of the flowtube. The illustrated sensor assembly 20 extends into the cavity 70 through the process penetration opening 22. Mover, in the illustrated embodiment, both the vortex sensor housing 32 and the temperature sensor housing 40 are positioned in the cavity 70 when the sensor assembly 20 is installed in the flowmeter 10.

Figure 4A:
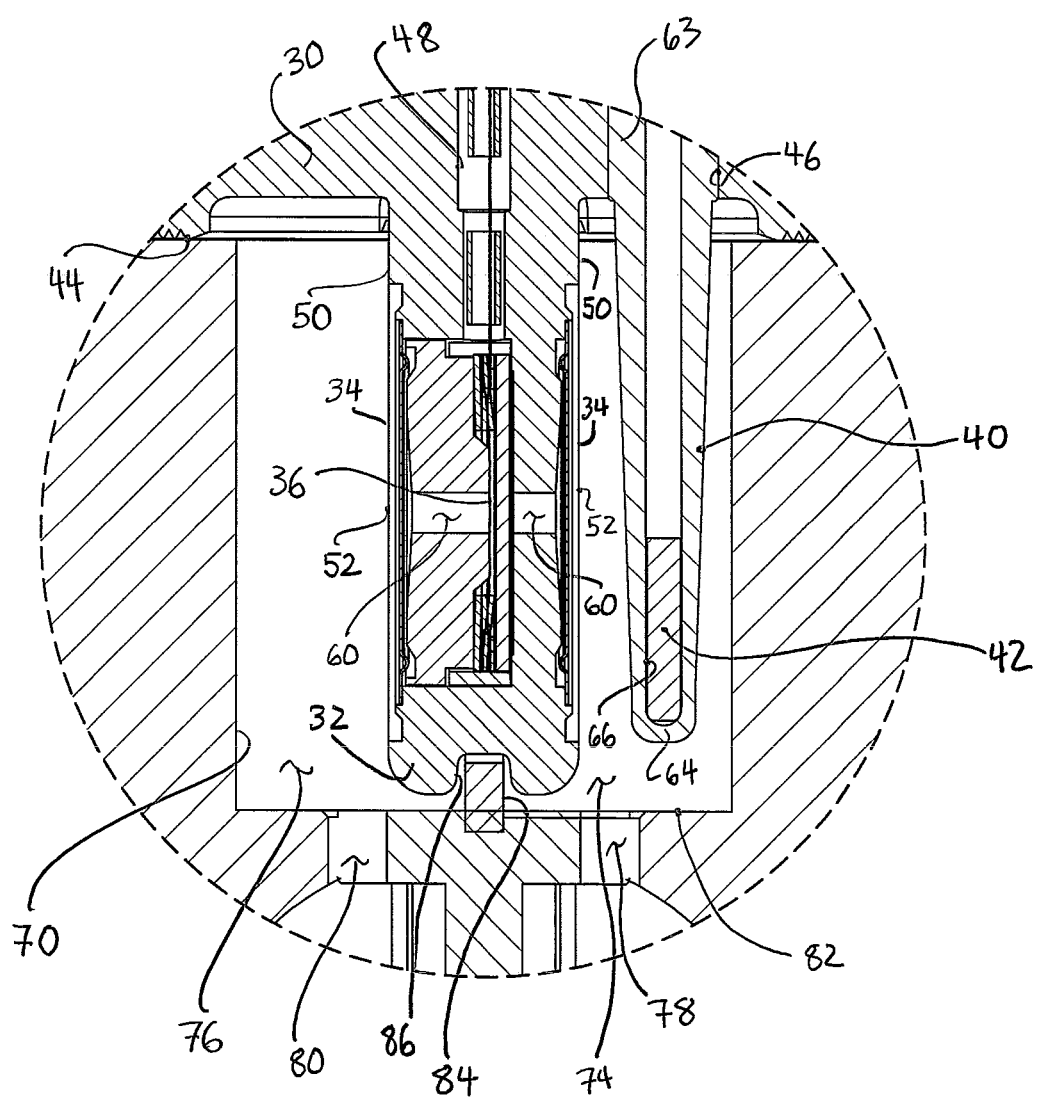
FIG. 4A is an enlarged fragmentary view of a portion of the vortex flowmeter as illustrated in FIG. 4.

As shown in FIG. 4A, the vortex sensor housing 32 separates the cavity 70 into two chambers 74, 76. Each of the two chambers 74, 76 has a respective port 78, 80 on opposite sides of the bluff body. The illustrated cavity 70 is partially defined by an inwardly extending shoulder 82 at the bottom of the cavity. In addition the cavity 70 is defined by the inner wall of the mounting pedestal and the sensor body 30. The temperature sensor housing 40 is positioned above the inwardly extending shoulder 82 in the chamber 74. The temperature sensor housing 40 and the vortex sensor housing 32 are positioned on opposite sides of the port 78 of the chamber 74 in the cavity 70. The port 78 is positioned laterally between the temperature sensor housing 40 and the vortex sensor housing 32. Accordingly, the port 78 is between the temperature sensor 42 and the pressure responsive diaphragm 34. In the illustrated embodiment, the vortex sensor housing 32 is secured to the top of the bluff body 18. More specifically, as shown in FIG. 4A, a groove 86 in the vortex sensor housing 32 mates with a tongue 84 extending upwardly from the bluff body 18. The illustrated sensor assembly 20 is secured to the flowtube 12 (e.g., using threaded bolts, etc.) such that the tongue 84 and the groove 86 form a fluid seal. As a result, the pressure-responsive diaphragms 34 are more sensitive to pressure differences in the flowtube on opposite sides of the bluff body. The sensor housing 32 is secured to the flowtube 12 so as to be relatively stationary with respect thereto. The pressure variations in the fluid flow are applied to the pressure-responsive diaphragms 34, which move relative to the sensor housing 32. It should be understood that the sensor housing can be secured to the flowtube in other ways without departing from the scope of the invention.

Referring to FIG. 1, the vortex flowmeter 10 of the illustrated embodiment includes a transmitter 90. The transmitter 90 is configured to receive signals from the vortex sensor 36 and the temperature sensor 42 and output a flow rate of the process fluid flowing through the passage 16. For example, the transmitter 90 can be configured to output a volumetric flow rate and/or a mass flow rate. The transmitter 90 is connected to the electrical conductors 62 and 68 (FIG. 7) to receive the vortex and temperature signals therefrom.

In one embodiment of a method of using the vortex flowmeter 10, the sensor assembly 20 is installed in the process penetration opening 22 of the flowmeter 10 such that the vortex sensor housing 32 and the temperature sensor housing 40 extend into the cavity 70. The flowmeter 10 is installed in a fluid pipeline and a process fluid is flowed through the pipeline. The fluid flowing through the pipeline flows into the flowtube 12 and through the passage 16. As the fluid flows through the passage 16, it encounters the leading face of the bluff body 18. A boundary layer of fluid is formed along the leading face of the bluff body 18 and vortices are generated in the fluid downstream of the bluff body. The vortices are generated in an alternating fashion on opposite sides of the bluff body 18. A differential pressure caused by the vortices acts on the pressure-responsive diaphragms 34 of vortex sensor housing 32. The vortex sensor 36 detects the movements of the pressure-responsive diaphragms 34 in response to the pressure fluctuations associated with the vortices in the fluid. The alternating movement of the pressure-responsive diaphragms 36 occurs at a frequency that is substantially the same as the frequency at which vortices are generated in the process fluid. Thus, the vortex signal from the vortex sensor 36 includes an indication of the frequency at which vortices are generated in the process fluid. The vortex signal is transmitted over the electrical conductor 62 to the transmitter 90, which uses the indication of frequency to calculate a volumetric flow rate of the fluid flow through the vortex meter 10.

While the vortex sensor 36 is detecting and transmitting an indication of the frequency of vortex generation, the temperature sensor 42 monitors the temperature of the process fluid. Vortex frequency values and process fluid temperature values can be updated (e.g., using an analog to digital converter) and provided to the transmitter 90 at the same or different rates without departing from the scope of the invention. As discussed above, when the vortex sensor assembly 20 is installed in the process penetration opening 22, the exterior surface of the temperature sensor housing is in contact with the process fluid in the cavity 70. The temperature sensor 42 senses the temperature of the process fluid in the cavity 70 and outputs a temperature signal. The temperature signal is transmitted over the electrical conductor 68 and is received by the transmitter 90. The transmitter 90 uses the temperature signal to calculate a density of the process fluid flowing through the flowtube 12. The calculated density is used along with the calculated volumetric flow rate to produce a mass flow rate measurement.

In the illustrated embodiment, the temperature signal from the temperature sensor 42 is the only process variable used to calculate density. This embodiment is particularly suited for, for example, measuring the mass flow rate of saturated steam because the density of saturated steam can be inferred from temperature of the process fluid. Likewise, this embodiment is particularly well suited for measuring the mass flow rate of incompressible liquids because density can be inferred from temperature. Other fluid densities vary as function of temperature and pressure or other process variables. It is contemplated that the transmitter 90 may be configured to receive other process variable signals to calculate the density of other types of process fluids.

In addition to calculating density, the temperature signal received from the temperature sensor 42 can be used to compensate the volumetric flow rate calculation. For example, one skilled in the art will appreciate that a flowmeter 10 has a K factor that bears a relationship to volumetric flow rate and the frequency at which vortices are generated. It is further understood that this K factor can vary as a function of temperature due to thermal expansion of the meter bore and as a function of the coefficient of thermal expansion of the flowmeter. The temperature signal from the temperature sensor 42 can be used by the transmitter 90 to compensate the K factor used to calculate volumetric flow rate. Likewise, the temperature signal from the temperature sensor 42 can also be used by the transmitter 90 to compensate a viscosity value of the process fluid used to calculate volumetric flow rate. Still other temperature compensation techniques may also be employed without departing from the scope of the invention. Though the above discussion indicates that the transmitter 90 processes signals from the temperature sensor 42 and vortex sensor 46 and calculate various measurements and compensations, it is understood that the measurement and compensation calculations performed by the transmitter can be performed by other processors (e.g., workstations, flow computers, etc.) without departing from the scope of the invention.

In one embodiment of a method of making the sensor assembly 20, the sensor body 30 and the vortex sensor housing 40 are formed as one piece. Suitably, the sensor body 30 and the vortex sensor housing 40 are cast as a single piece of metal, machined from a single block of solid metal, or any combination of the two. The vortex sensor 36 is installed in the vortex sensor housing, and the pressure-responsive diaphragms 34 are secured to the lateral sides 50 of the vortex sensor housing 40. The mounting hole 46 is made in the sensor body 30. For example, the mounting hole 46 is drilled or otherwise bored into the sensor body 30. Alternatively, the mounting hole 46 can be cast into the sensor body 30. In some embodiments, the mounting hole 46 is constructed to have a tapered configuration to matingly receive the tapered outer surface of the temperature sensor housing. Once the mounting hole 46 is provided, the temperature sensor housing 40 is secured through the mounting hole. In a suitable embodiment, the temperature sensor housing 40 is press fit into the mounting hole 44 and bonded (e.g., by laser welding) to the sensor body 20. The temperature sensor 42 is threaded into the chamber 66 of the temperature sensor housing 40.

Then, the vortex sensor assembly 20 is installed in the process penetration opening 22 of a flowmeter, which is subsequently installed in a process fluid pipeline.

The vortex sensor assembly 20 can be provided as a replacement component for installed vortex flowmeters 10 that used a conventional sensor assembly.

Figure 8:
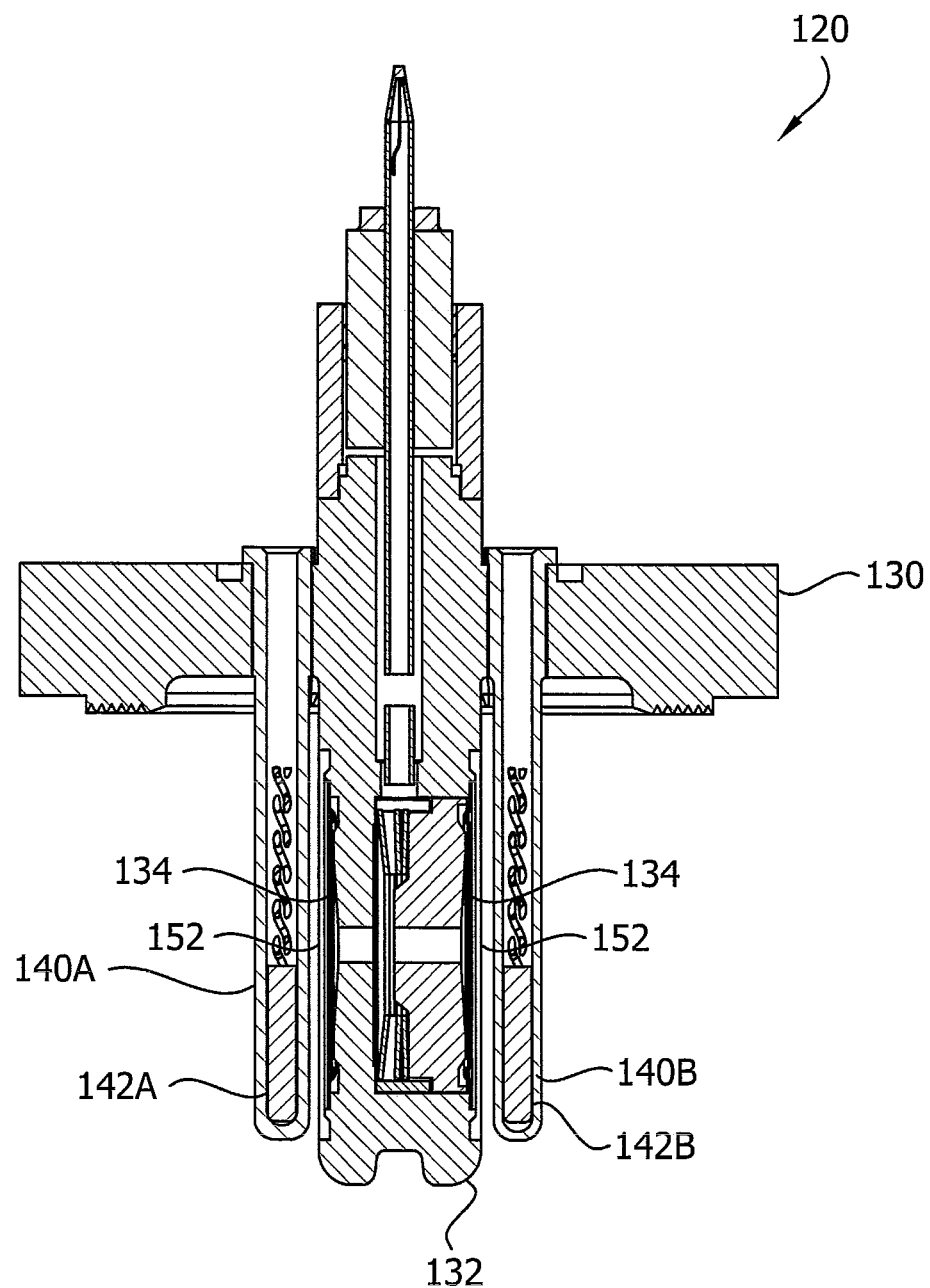
FIG. 8 is a cross section of another embodiment of a sensor assembly.

Referring to FIG. 8, another embodiment of a vortex sensor assembly is generally indicated at reference number 120. The vortex sensor assembly 120 is substantially similar to the vortex sensor 20 of FIGS. 1-7. Similar features are given the same reference number, plus 100. Unlike the vortex sensor assembly 20, the vortex sensor assembly 120 includes two temperature sensor housings 140A and 140B and two temperature sensors 142A and 142B. Each of the temperature sensor housings 140A and 140B extends away from the sensor body 130 along a longitudinal axis that is parallel to the surface 152 of an adjacent one of the diaphragms 134. In the illustrated embodiment, each of the temperature sensor housings 140A and 140B is positioned relative to the respective diaphragm 134 in the same way described above for the temperature sensor housing 40.

Figure 9:
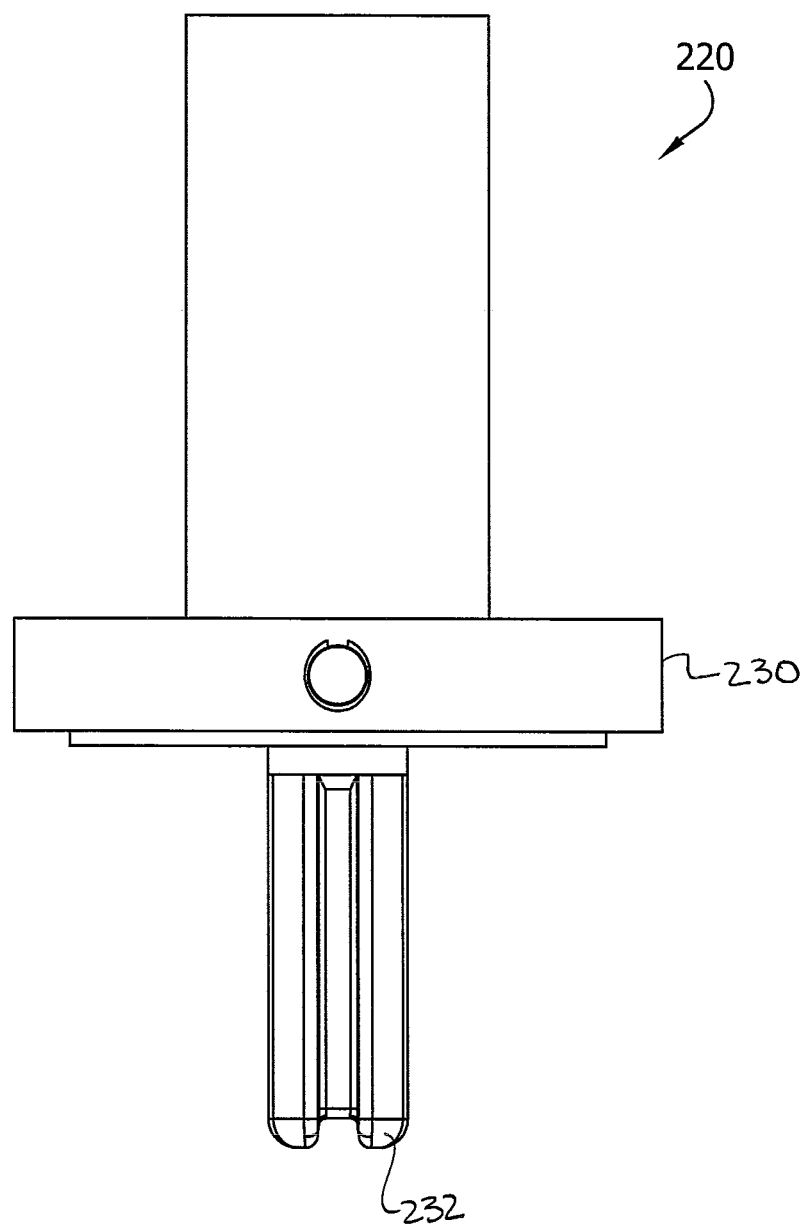
FIG. 9 is a front elevation of another embodiment of a sensor assembly.
Figure 10:
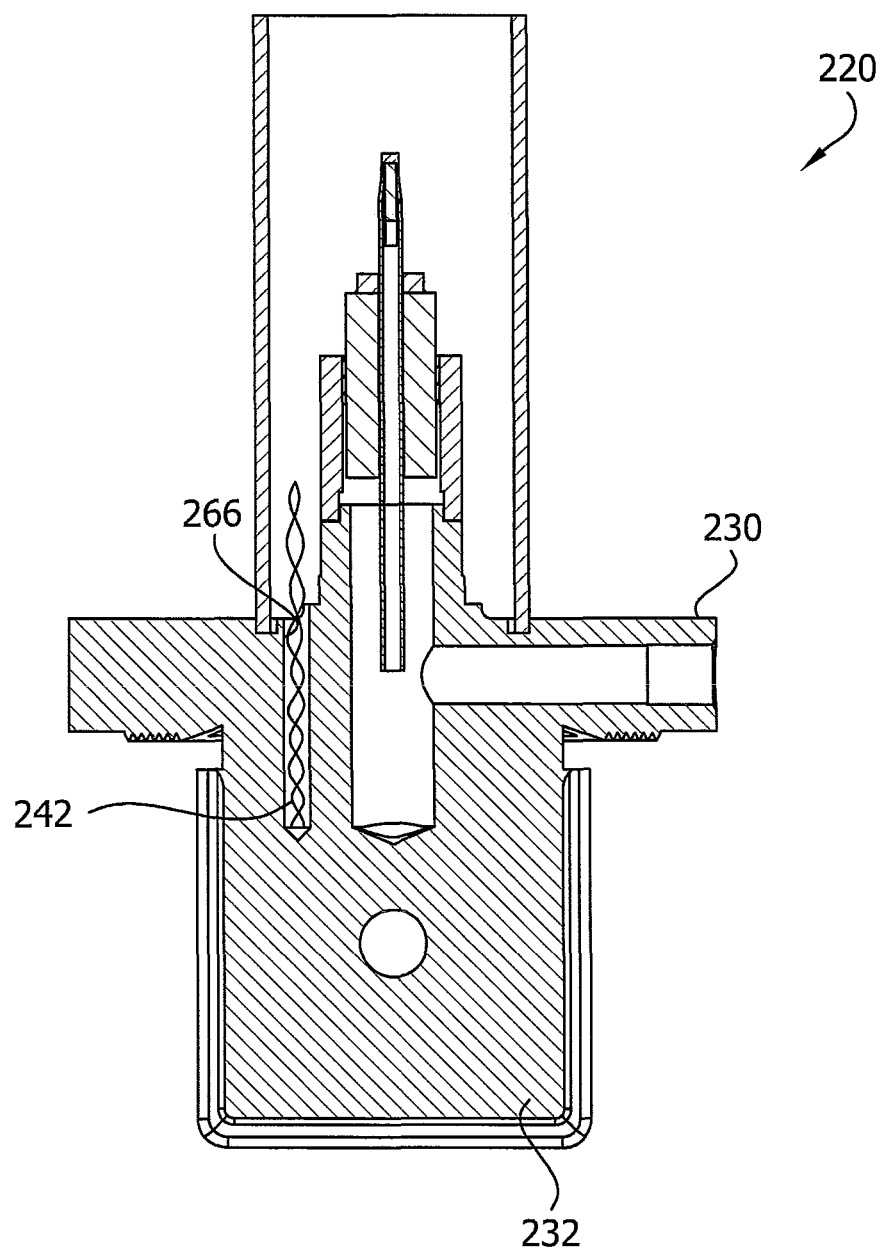
FIG. 10 is a cross section of the sensor assembly of FIG. 9.

Referring to FIGS. 9-10, another embodiment of a vortex sensor assembly is generally indicated at reference number 220. Except as noted, the vortex sensor assembly 220 is substantially similar to the vortex sensor 20 of FIGS. 1-7. Similar features are given the same reference number, plus 200. The sensor assembly 220 includes a temperature sensor chamber 266 that is provided in the vortex sensor housing 232. The sensor chamber 266 extends into the vortex sensor housing 232 such that the sensor chamber is separated from each of the fluid paths that connect the pressure responsive diaphragms with the vortex sensor. The sensor chamber 266 is suitably fluidicly isolated from the vortex sensor. A temperature sensor 242, such as an RTD, thermistor, thermocouple, etc., extends into the sensor chamber 266 and senses the temperature of the process fluid through a wall of the vortex sensor housing 232 which extends into the process fluid. However, like the vortex sensor assembly 20 of FIGS. 1-7, the temperature sensor 242 extends into a sensor chamber 266 that is secured to (e.g., cast in place with respect to) the sensor body 230. As a result, like the embodiment of FIGS. 1-7, the vortex sensor assembly 220 provides highly accurate and responsive temperature measurement using a single process penetration with the vortex sensor. In addition, the temperature sensor 242 is robustly secured to the sensor body 220 at a location in which it is protected (by the vortex sensor housing 232) from the potentially harsh and/or hazardous conditions of the process fluid. Moreover, the vortex sensor can be filled with fill fluid without insulating the temperature sensor from the temperature of the process fluid. However, it should be understood that fluid passages can be vented to atmosphere without departing from the scope of the invention.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of making a sensor assembly for a vortex flowmeter of the type having a flowtube having a flowtube wall defining a passage for flow of a process fluid through the flowtube, a bluff body in the flowtube for generating vortices, and a sensor for detecting vortices formed by the bluff body, the sensor assembly being configured to extend into contact with the process fluid through a process penetration opening, the method comprising:
    securing a vortex sensor to a vortex sensor housing, the vortex sensor housing being secured to a sensor body configured to seal the process penetration opening to limit flow of process fluid from the passage out of the flowmeter through the process penetration opening;
    securing a pair of pressure-responsive diaphragms, each having a process fluid-contact surface, to the vortex sensor housing such that the pressure-responsive diaphragms are on opposite sides of the vortex sensor housing and the process fluid-contact surfaces face away from one another and such that the vortex sensor is positioned to detect motion of at least one of the pressure-responsive diaphragms to detect vortices formed in the process fluid;
    making a mounting hole in the sensor body spaced apart from the vortex sensor housing;
    securing a temperature sensor housing to the sensor body through the mounting hole so that the temperature sensor housing is spaced apart from the vortex sensor housing; and
    inserting a temperature sensor in the temperature sensor housing for sensing a temperature of the process fluid;
    wherein the process-fluid contact surfaces are configured to be directly exposed to process fluid flowing through the flowtube when the sensor assembly is installed in the flowtube.

2. The method as set forth in claim 1, further comprising casting the sensor body and the vortex sensor housing as one piece.

3. The method as set forth in claim 1, wherein the temperature sensor housing is configured to fit in the mounting hole as a press fit connection.

4. The method as set forth in claim 1, wherein said bonding comprises laser welding the temperature sensor housing to the sensor body.

5. The method as set forth in claim 4, wherein said bonding comprises laser welding the temperature sensor housing to the sensor body.

6. The method as set forth in claim 1, wherein the process penetration opening is formed in the flowtube at only a single location about the perimeter of the flowtube.

* * * * *